US009045986B2

(12) United States Patent
Bianchi et al.

(10) Patent No.: US 9,045,986 B2
(45) Date of Patent: Jun. 2, 2015

(54) ROTOR BLADE AND AN AIRCRAFT

(75) Inventors: Laurent Bianchi, Marseilles (FR);
Jacques Gaffiero, Paris (FR); Alain Charreyre, Mortefontaine (FR);
Francois Marchand, Villeparisis (FR)

(73) Assignee: Airbus Helicopters, Marignane Cedex (FR)

( * ) Notice: Subject to any disclaimer, the term of this patent is extended or adjusted under 35 U.S.C. 154(b) by 477 days.

(21) Appl. No.: 13/534,172

(22) Filed: Jun. 27, 2012

(65) Prior Publication Data

US 2013/0177422 A1    Jul. 11, 2013

(30) Foreign Application Priority Data

Jun. 30, 2011  (FR) ..................... 11 02043

(51) Int. Cl.
| | |
|---|---|
| F01D 5/14 | (2006.01) |
| B29D 99/00 | (2010.01) |
| B64C 11/26 | (2006.01) |
| F01D 25/00 | (2006.01) |
| B64C 27/473 | (2006.01) |
| B64C 27/48 | (2006.01) |

(52) U.S. Cl.
CPC ............ F01D 5/147 (2013.01); B29D 99/0028 (2013.01); B64C 11/26 (2013.01); B64C 2027/4736 (2013.01); B64C 27/48 (2013.01); F01D 25/00 (2013.01)

(58) Field of Classification Search
USPC ..................... 416/226, 230; 29/889.7, 889.71
See application file for complete search history.

(56) References Cited

U.S. PATENT DOCUMENTS

| | | | |
|---|---|---|---|
| 3,552,881 A | | 1/1971 | Rogers |
| 3,950,115 A | * | 4/1976 | Euler ........................ 416/226 |
| 4,696,623 A | * | 9/1987 | Bost ......................... 416/230 |
| 4,961,687 A | | 10/1990 | Bost |
| 4,966,527 A | | 10/1990 | Merz |
| 5,129,787 A | | 7/1992 | Violette |

(Continued)

FOREIGN PATENT DOCUMENTS

| | | |
|---|---|---|
| EP | 0307288 A1 | 3/1989 |
| EP | 0353672 A2 | 2/1990 |

(Continued)

OTHER PUBLICATIONS

Search Report and Written Opinion; Application No. FR 1102043; dated Jan. 27, 2012.

*Primary Examiner* — Liam McDowell
(74) *Attorney, Agent, or Firm* — Brooks Kushman P.C.

(57) ABSTRACT

A rotor blade (1) provided with an outer covering (2) and with at least one load take-up spar (10) associated with at least one pin-receiving bushing (3). Each spar (10) is a compartmentalized spar comprising centrifugal force take-up means (20) incorporated within a twisting stress take-up casing (30), said centrifugal force take-up means (20) comprising at least two boxes (21, 22), each having said pin-receiving bushing (3) of the spar (10) passing therethrough, each box (21, 22) including a closed retention belt (23) extending in the spanwise direction of the blade, the retention belt (23) of one box (22) surrounding the retention belt (23) of another box (21), each retention belt (23) being provided with unidirectional fibers (24) wound around said pin-receiving bushing (3), said casing (30) being provided with inclined fibers (31) presenting an angle relative to said unidirectional fibers (24).

19 Claims, 5 Drawing Sheets

(56) References Cited

U.S. PATENT DOCUMENTS

2009/0010764 A1* 1/2009 Parisy et al. .................. 416/226
2010/0266416 A1* 10/2010 Marshall et al. ............. 416/226

FOREIGN PATENT DOCUMENTS

EP 0570527 A1 11/1993
FR 1579886 A 8/1969

* cited by examiner

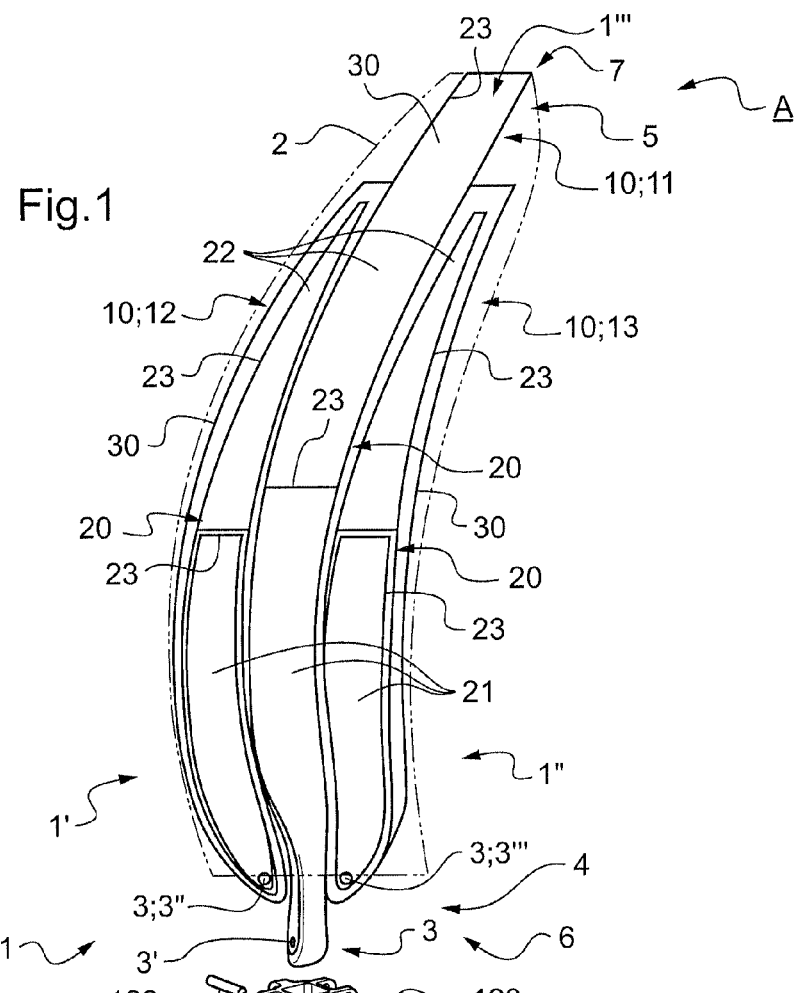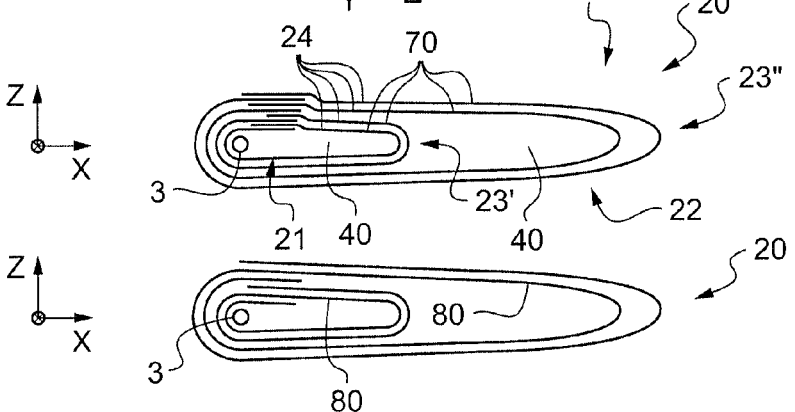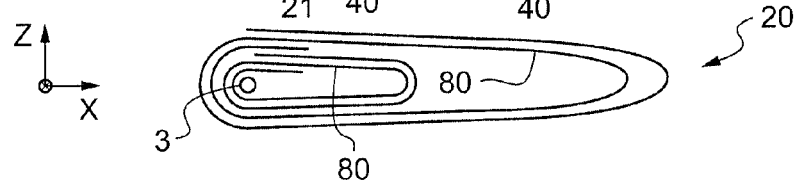

ROTOR BLADE AND AN AIRCRAFT

CROSS REFERENCE TO RELATED APPLICATIONS

This application claims priority to FR 11 02043 filed on Jun. 30, 2011, the disclosure of which is incorporated in its entirety by reference herein.

BACKGROUND OF THE INVENTION (1) Field of the invention

The present invention relates to a rotor blade, and to an aircraft provided with a blade.

More particularly, the blade may be a blade of a propulsive propeller of an aircraft, or a blade of a lift rotor of a rotorcraft, or of a yaw control rotor of such a rotorcraft. Nevertheless, such a blade may be used for other types of rotor in the context of a compressor blade, a wind turbine blade, a fan rotor, or indeed a rotor for propelling a ship, for example.

(2) Description of Related Art

In its rotary motion, a blade is subjected to a torsor, i.e. in strength-of-materials terms, to a general resultant force and to a resultant moment at each point. Consequently, such a blade is subjected in particular to a centrifugal force and also to multiple loads due to flapping, to drag, and to twisting movements; where twisting is caused in particular by changes of pitch seeking to modify the angle of inclination of the blade relative to the plane of the hub supporting the blade. Naturally, the forces give rise to bending and twisting moments.

The forces and moments to which the blade is subjected as a result in particular of centrifugal force and of twisting stresses thus need to be transmitted to the hub by the blade.

The means for fastening the blade to the hub are therefore subjected to forces and to moments that can be destructive, where the term "load" is used below to designate said forces and/or said moments, for reasons of simplification.

Conventionally, a blade comprises a shell sometimes referred to as a "covering" or indeed an "outer covering".

The shell is provided with a suction-side wall and a pressure-side wall that extend from a leading edge first zone to a trailing edge second zone. In a blade made of composite materials, the shell may have a suction-side wall and a pressure-side wall that are secured to each other, each comprising at least one layer of fabric based on fibers of high mechanical strength that are embedded in a matrix. The suction-side wall and the pressure-side wall may be made separately and then joined together, or they may be made jointly, e.g. by winding.

The shell is hollow so that it can receive generally at least one spar serving in particular to take up the centrifugal loads that act on the blade in rotation, and at least one filler element. Each spar may be made of composite material, being made using fibers that are embedded in a matrix, the fibers describing a U-shaped structure, for example.

Furthermore, it is common practice to provide the trailing edge zone of the shell with a ledge in order to reinforce the blade in particular against drag stresses.

Document EP 0 570 527 describes a blade provided with a spar including at least one front torsion box element that is elongate in the span direction, and at least one rear torsion box element that is elongate in the span direction, the boxes being connected together by a chordwise shear web.

The spar is made of two casing halves adhesively bonded together back-to-back.

Document FR 1 579 886 describes a blade provided with a spar constituted by a box-shaped hollow structure that comprises two opposite U-shaped elements that are engaged one in the other.

Document EP 0 307 288 describes a rotor blade provided with an attachment device using bushings.

Document U.S. Pat. No. 3,694,104 presents a turbine engine blade.

Document EP 0 353 672 describes a propeller blade made of fiber-reinforced material.

BRIEF SUMMARY OF THE INVENTION

An object of the present invention is thus to propose an alternative blade having in particular a function of minimizing the consequences of an accidental impact.

According to the invention, a rotor blade is provided with an outer covering and with at least one load take-up spar associated with at least one pin-receiving bushing, the spar extending spanwise from an attachment zone towards a distal zone, the attachment zone of a spar having said at least one pin-receiving bushing of the spar passing therethrough. It should be observed that the attachment zone may project from the outer covering.

The blade is remarkable in particular in that each spar is a compartmentalized spar comprising centrifugal force take-up means incorporated within a twisting stress take-up casing, said centrifugal force take-up means comprising at least two boxes each box having said pin-receiving bushing of the spar passing therethrough, each box forming a compartment of a spar, each box including a closed retention belt extending in the spanwise direction of the blade, the retention belt of one box of a spar surrounding the retention belt of another box of the spar, each retention belt being provided with unidirectional fibers wound around said pin-receiving bushing, said casing being provided with inclined fibers presenting an angle relative to said unidirectional fibers.

It should be understood that the term "fibers" covers fibers of glass, basalt, carbon, Kevlar, or other types of equivalent reinforcing fiber, or indeed fiber fabric in strip form. These fibers may optionally either be "dusted", i.e. they may be impregnated with an injection resin for use in a fabrication method implementing an infusion type application or molding by resin transfer, or associated with an epoxy resin or the equivalent, or else associated with filament placement.

It can be understood that it is conceivable that fibers of various kinds may be combined in order to optimize the characteristics of the retention belts.

Furthermore, in order to take up the loads generated by centrifugal force on the blade while it is in use, the centrifugal force take-up means comprise unidirectional fibers directed along a longitudinal axis of the blade, for example. Nevertheless, these longitudinal unidirectional fibers may optionally be associated with fibers inclined at an angle relative to the longitudinal unidirectional fibers in order to improve the mechanical strength characteristics of the retention belt in a transverse direction, or indeed in order to improve fabrication conditions for the retention belt of a box.

In another aspect, each spar includes an outer casing for transmitting to a hub the twisting stresses that are exerted on the blade in rotation.

In a variant, the casing is made by winding a plurality of interwoven layers of inclined fibers presenting an angle relative to the longitudinal unidirectional fibers of the spar. Under such circumstances, a casing is obtained having multilayer winding, possibly provided with bonding fibers between the various layers, which bonding fibers participate in improving the mechanical strength and the ability to withstand impacts acting on the box. Such bonding fibers may be inserted either by a tufting method or by a pinning method.

In another variant, the casing is made by the centrifugal force take-up means having previously-braided tubes or "socks" of substantially tubular shape arranged thereon, the tubes having a diameter that matches the shape and the dimensions of the finished spar.

In another variant, the casing is made by complex braiding, combining conventional braiding of initial interwoven fibers typically extending at angles of plus or minus forty-five degrees relative to the longitudinal axis, with second longitudinal fibers being arranged parallel to the longitudinal axis and interwoven with the first fibers. This provides a casing presenting the required mechanical strength characteristics in the longitudinal direction, in addition to the required characteristics concerning mechanical strength in twisting.

Furthermore, it is possible to put a plurality of layers into place simultaneously, with connection fibers being arranged between the layers. The casing thus provides better characteristics in terms of ability to withstand impacts.

In another aspect, the outer covering provides the outer aerodynamic continuity of the airfoil portion of the blade. The outer covering may also be a covering working mainly to take up mechanical loads exerted on the blade, such as twisting moments exerted along the twisting axis of the blade. This working outer covering may then be made using any of the above-mentioned techniques applied so as to obtain a covering that takes up twisting stresses.

Furthermore, the outer covering constitutes a projection barrier of the blade in the event of an impact with a projectile. Thus, the outer covering may comprise woven fibers in the form of fabrics that are independent or bonded together, simple two-dimensional braids, complex three-dimensional braids with inter-layer connection yarns, or even provided with stitching using stitching and/or tufting techniques.

In particular, the outer covering may be made so as to present longitudinal fibers that are optionally but not necessarily interwoven with fibers arranged on the bias, in particular to contribute to taking up centrifugal loads, specifically in the event of failure of a portion of the spars. This type of multi-axis outer covering may be made either by superposing fabric layers or sheets, or by a multi-axis braiding method that may also present the characteristic that is known as "interlock".

The outer covering is then fastened to the spars by means of a shear/pull-out connection based on resin or on an interface adhesive, for example.

Consequently, in the invention, each spar has a plurality of boxes, each defined by a closed retention belt, each box co-operating with the same pin-receiving bushing by being wound around said pin-receiving bushing.

Under such circumstances, it can be seen that a spar has more material in its attachment zone, commonly referred to as its "root" zone, than at its other end.

Furthermore, each spar then has at least two boxes engaged one in the other, the retention belt of one box being surrounded by the retention belt of another box. For example, each spar has at least one so-called "original" box engaged directly in a box referred to for convenience as a "final" box, or indirectly via at least one intermediate box. In one embodiment, a spar has two boxes comprising an original box with an original retention belt arranged in the final retention belt of a final box, while a three-box spar is provided with an original box having an original retention belt arranged in an intermediate retention belt of an intermediate box, the intermediate retention belt being surrounded by a final retention belt of the final box.

Each box is then defined firstly by its retention belt forming a closed loop, and by the casing for taking up twisting stresses It should be recalled that the term taking up "loads" is used to mean taking up forces and/or moments exerted on the blade.

On an ordinary blade provided with a spar that is U-shaped, i.e. not O-shaped in accordance with the invention, when that blade is subjected to maximum loads and in particular to loads due to a maximum centrifugal force, following an impact, the fibers of the spar may be weakened and may break one after another, starting from the surface of the spar that is closest to the outer covering and going towards the core of the spar. Fibers that were not damaged immediately after an impact need to withstand ever-increasing loads, and such undamaged fibers can then break one after another until the spar breaks completely after an incident.

With the structure of the invention, which has spanwise nested boxes unlike the prior art, after an impact, the fibers of the final box closest to the outer covering still run the risk of breaking However, the other fibers of the other boxes retain their integrity and continue to provide structural strength for the blade.

Thus, even if a box is damaged, the spar includes at least one other box to pass the loads to which the blade is subjected towards a hub. The damaged box then acts as a fuse so that the performance of the blade continues to be acceptable.

The blade may also include one or more of the following additional characteristics.

For example, the blade may extend chordwise from a trailing edge zone towards a leading-edge zone by passing through a central zone, and the blade may include at least two spars that are held one against the other by the outer covering, these two spars being selected from a predetermined list including: a trailing edge extreme spar placed in the trailing edge zone; a leading edge extreme spar placed in the leading edge zone; and a central spar placed in the central zone; each spar having its own pin-receiving zone.

The blade is then not only compartmentalized in its spanwise longitudinal direction by the presence of at least two boxes per spar, but it is also compartmentalized in a transverse direction of the blade as a result of the presence of at least two spars.

If a box of the spar is damaged, the remaining boxes of that spar remain functional. For example, in a three-box spar, the final box may be damaged, while the intermediate and original boxes remain functional.

Furthermore, if all of the boxes of a spar are damaged, the loads to which the blade is subjected pass via the other boxes of the other spars. The loads due to centrifugal force and to the flapping and drag moments in particular are no longer transmitted to a hub by the pin-receiving bushing of the damaged spar, but they continue to be transmitted by the pin-receiving bushings of the other spars. It should be observed that the outer covering may also contribute to transmitting at least a fraction of the applied forces and moments towards these pin-receiving bushings.

Furthermore, the blade may include an additional covering arranged between the spars and the outer covering, or outside the outer covering, or else within the outer covering.

It should be observed that in the event of a spar rupturing, by redundancy, the loads may pass from one spar to the other via the outer covering. The outer covering contributes to transmitting centrifugal loads and flapping and drag moments only in the event of a spar rupturing.

When a manufacturer dimensions the outer covering of a blade, the manufacturer needs to make a compromise between the static or fatigue mechanical strength and the level of impact energy absorption.

The invention thus makes it possible to increase the impact energy absorption function. Because of the twisting reinforcement arranged on the spars, it is possible to envisage, to some extent, lightening the contribution of the outer covering to taking up twisting loads, unlike conventional airplane or helicopter blades that have outer coverings that contribute significantly to taking up twisting loads.

Under such circumstances, it becomes possible to add an additional covering thereto.

This additional covering may include a covering referred to as a covering that is "reinforced against impacts" made of composite fabric of the so-called "interlock" type for optimizing the outer covering from the point of view of absorbing impact energy. The anti-impact covering may either be slid between the spars and the outer covering, or it may be slid onto the outside of the outer covering so as to be directly in contact with the air, or else it may be sandwiched between two fabrics of the outer covering.

It should be recalled that an "interlock" fabric is woven in a manner that is equivalent to assembling together a plurality of layers of a "conventional" fabric, with this being done by weaving yarns from one layer to another. This configuration significantly improves the ability of the fabric to tolerate damage.

In addition, or as a replacement for the covering that is "reinforced against impacts", the additional covering may include a "damping" covering. Such a damping covering may for example comprise a material of the filled elastomer type.

In one option, the blade may include connection reinforcement. The connection reinforcement comprises transverse connection fibers put into place by a stitching method or a pinning method, the connection fibers passing through the outer covering and of the spars, and also through the additional covering, if any.

Under such circumstances, the connection reinforcement provides paths for taking up loads between the spars and the outer covering so as to optimize the contribution of the outer covering to taking up centrifugal loads in the event of a portion of the spars failing.

In another aspect, the blade extends spanwise from a root to a free end, and the central spar may extend spanwise from the root towards the free end.

Furthermore, the central spar may include a retention belt provided with a top surface facing a suction-side surface of the blade and a bottom surface facing a pressure-side surface of the blade.

In contrast, at least one extreme spar may include a retention belt provided with a first surface facing the leading edge of the blade and a second surface facing the trailing edge of the blade.

This particular inclination of the extreme spars gives them damping characteristics following an impact, it being possible for the extreme spar to absorb a portion of the energy that results from the impact, e.g. like a car bumper.

Furthermore, in a variant, the blade includes at least a first spar co-operating with a first pin-receiving bushing and a second spar co-operating with a second pin-receiving bushing, the first pin-receiving bushing and the second pin-receiving bushing being offset in the chord direction and/or in the span direction.

It can be understood that the blade includes at least one pin-receiving bushing per spar. The pin-receiving bushings may then be positioned side-by-side while being offset chordwise, i.e. in a transverse direction of the blade, in tandem by being offset spanwise, i.e. one behind another in a longitudinal direction of the blade, or else offset both chordwise and spanwise.

In another aspect, at least one given box of a spar may include filler means incorporated in the retention belt defining said given box.

The filler means may comprise a filler foam optionally provided with reinforcement in the form of a jumper, or a rigid member obtained by braiding, for example.

It should be observed that when the blade includes connection reinforcement between the outer covering and each spar, the connection fibers of the connection reinforcement are preferably arranged in register with the filler foam so as to avoid damaging the reinforcement of the spar.

The filler means may also present a filler body presenting damping characteristics and/or shock absorbing characteristics as a result of the nature of the materials from which it is made and/or as a result of the shapes of its internal structure.

The retention belt advantageously forms retention loops that avoid the filler means of the box escaping. It should be observed that jumper made of fabric, for example, may be provided in these loops and on the filler means in order to reinforce this retention effect.

Thus, the segmentation of the spar as a plurality of nested boxes makes it possible to limit the extent to which material may be torn out after an impact, and in particular the material constituting the filler means. This concept of retaining material then has the advantage of limiting the mass of material that might be taken away by an impact, and consequently limits the dangerous unbalance that would result from such loss of material. The nature of the filler bodies may also be formulated specially to absorb the energy of impacts. These filler bodies may also be arranged to receive special impact damper devices, for example based on the principle of absorption by deformation or by breaking sacrificial parts.

Alternatively, the retention belts may be sufficiently rigid to avoid the need to have any filler means present.

Furthermore, the unidirectional fibers may be directed along a longitudinal axis of the blade, and the casing of a spar may optionally be provided with fibers presenting an angle lying in the range zero to plus or minus ninety degrees relative to said longitudinal axis. The spar can then contribute to transmitting twisting stresses.

In another aspect, the outer covering may include at least one piece of equipment selected from a group comprising means for combating the icing phenomenon, and means for providing shielding protection against impacts.

In an embodiment, at least one retention belt may comprise a plurality of superposed and distinct layers of unidirectional fibers, each layer including at least one loop of unidirectional fibers wound around said pin-receiving bushing.

In an alternative embodiment, at least one closed retention belt comprises a tape of unidirectional fibers spiral wound around the pin-receiving bushing.

Furthermore, the blade may include attachment means comprising a fitting provided with respective fastener means for each pin-receiving bushing.

When blade is provided with a central spar arranged between a leading edge extreme spar and a trailing edge extreme spar, the attachment zone of the central spar may optionally co-operate via shape interference with a docking orifice formed in the fitting, and the attachment zone of each extreme spar being fastened in a respective fork of the fitting.

Furthermore, the blade may include an attachment sleeve, the fitting being partially inserted in a bore of the sleeve, and being reversibly fastened to the sleeve by at least one attachment member.

In addition, the sleeve is optionally secured to a pitch control shaft, the pitch control shaft presenting a retention shoulder outside the sleeve.

In addition to a blade, the invention also provides an aircraft provided with a rotor, the rotor including at least one such blade.

BRIEF DESCRIPTION OF THE SEVERAL VIEWS OF THE DRAWINGS

The invention and its advantages appear in greater detail from the following description of embodiments given by way of illustration with reference to the accompanying figures, in which:

FIG. 1 is a diagram of an aircraft of the invention;

FIG. 2 is a diagram explaining a first embodiment of a spar;

FIG. 3 is a diagram explaining a second embodiment of a spar;

Figure 4:
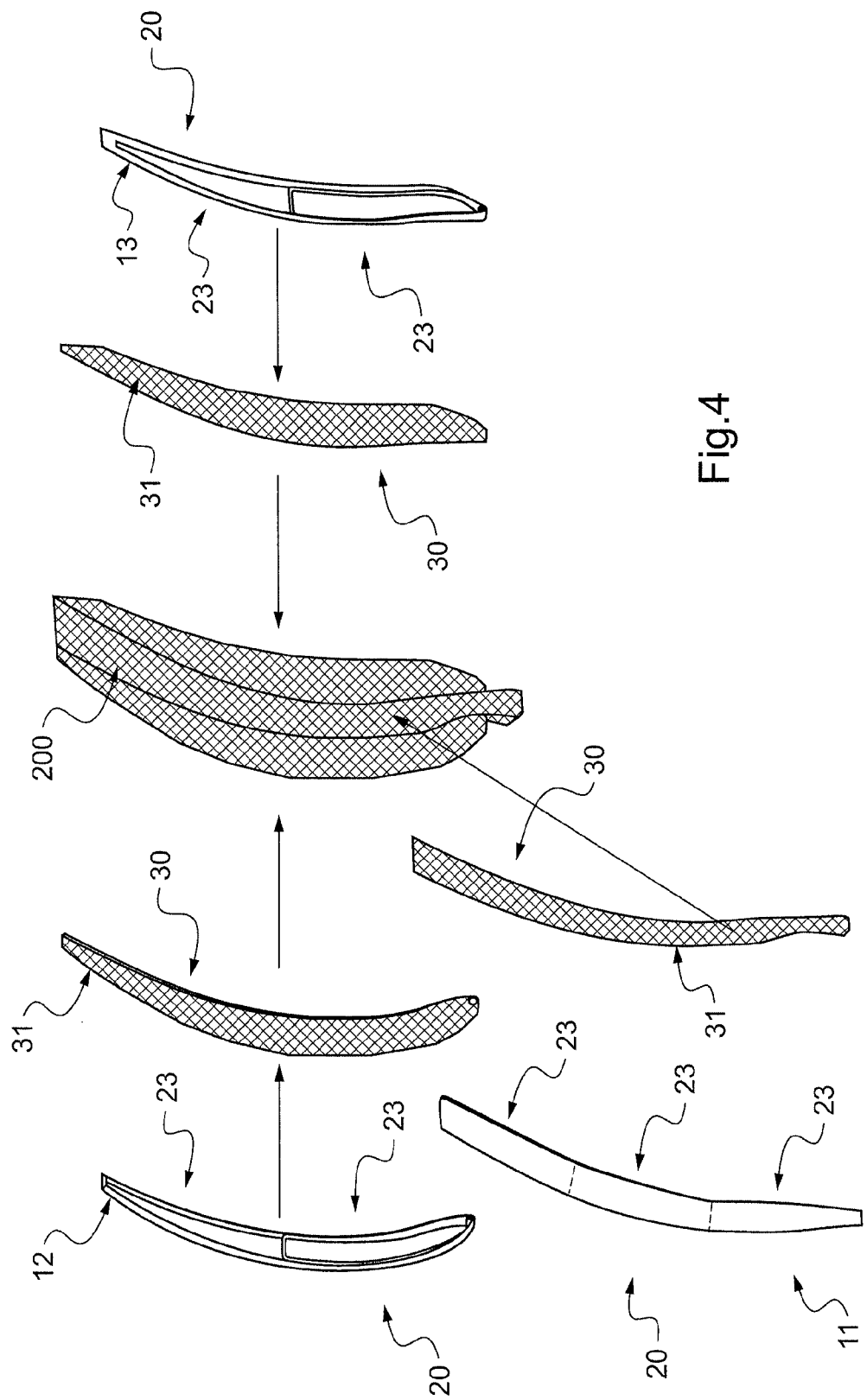
FIGS. 4 and 5 are two diagrams explaining a method of fabricating the blade of the invention.

Elements that are present in more than one of the figures are given the same references in each of them.

DETAILED DESCRIPTION OF THE INVENTION

It should be observed that three mutually orthogonal directions X, Y, and Z are shown in some of the figures.

The first direction X is said to be longitudinal. The term "longitudinal" relates to any direction parallel to the first direction X. The first direction relates to the span of a blade.

The second direction Y is said to be transverse. The term "transverse" relates to any direction parallel to the second direction Y.

Finally, the third direction Z is said to be in elevation. The term "in elevation" relates to any direction parallel to the third direction Z.

FIG. 1 shows an aircraft A having a rotor with a blade 1. Only the blade 1 is shown, for convenience in order to avoid pointlessly overloading FIG. 1.

The blade 1 extends span lies in the first direction X from a root 6 to a free end 7, and in the second direction Y from a trailing edge zone 1" to a leading edge zone 1', passing via a central zone 1'''. Finally, the blade extends in the third direction Z from a pressure side to a suction side.

The blade 1 has an outer covering 2 surrounding at least one load take-up spar 10 for transmitting the loads to which the blade 1 is subjected to the hub of the rotor. Each spar thus extends from an attachment zone 4, which projects from the outer covering 2 in the example shown, towards a distal end 5 arranged inside the outer covering 2.

It should be observed that a spar may nevertheless reach the free end 7 of the blade 1.

Each attachment zone 4 of each spar 10 then includes a pin-receiving bushing 3 that co-operates with attachment means 100 for connection to the hub of the rotor. The term "attachment zone" thus covers the end of the spar for connecting to blade attachment means.

Furthermore, the blade has at least two spars 10, held against each other by the outer covering 2. In the example shown, the blade includes a trailing edge extreme spar 13 placed in the trailing edge zone 1", a leading edge extreme spar 12 placed in the leading edge zone 1', and a central spar 11 placed in the central zone 1''' and possibly reaching the free end 7, each spar having its own pin-receiving zone 3.

Thus, the attachment means 100 may comprise a fitting 113 provided with one fastener means 120 per pin-receiving bushing. The fastener means may include a first pin 121 co-operating with the pin-receiving bushing 3' of the central spar 11, a second pin 122 cooperating with the pin-receiving bushing 3" of the leading edge extreme spar 12, and a third pin 123 co-operating with the pin-receiving bushing 3''' of the trailing edge extreme spar 13.

It should be observed that two pin-receiving bushings of two distinct spars may be offset in the chord direction and/or in the span direction, i.e. respectively relative to the second direction and to the first direction.

For example, the second pin-receiving bushing 3" of the leading edge extreme spar 12 and the third pin-receiving bushing 3''' of the trailing edge extreme spar 13 are offset in the chord direction.

Likewise, the first pin-receiving bushing 3' of the central spar 11 and the second pin-receiving bushing 3" of the leading edge extreme spar 12 or the third pin-receiving bushing 3''' of the trailing edge extreme spar 13 are offset in the span direction.

Furthermore, each spar is a compartmentalized spar including firstly a casing 30 for taking up twisting stresses, and secondly means 20 for taking up centrifugal force and incorporated in the casing 30.

The centrifugal force take-up means 20 are then provided with at least two boxes 21 and 22 nested one inside the other, each box co-operating with the pin-receiving bushings of the spar. Each box of a spar thus forms a compartment of the spar.

Thereafter, each box has a closed retention belt 23 with unidirectional fibers wound around the pin-receiving bushings(s) of the spar. The unidirectional fibers are directed along the longitudinal axis of the blade parallel to the first direction X in order to transmit to the hub the loads to which the blade 1 is subjected as a result of centrifugal force.

Furthermore, it can be understood that the retention belt of a box of a spar is surrounded by the retention belt 23 of another box of the same spar.

In the first embodiment of FIG. 2, at least one retention belt 23 comprises a plurality of superposed and distinct layers 70 of unidirectional fibers 24. Each layer 70 then comprises at least one loop of unidirectional fibers wound around said pin-receiving bushing.

In the variant shown, the first retention belt 23' of a first box 21 and the second retention belt 23" of a second box 21 both have two respective layers 70.

It should be observed that at least one box 21, 22 may include filler means 40, the filler means being arranged inside the retention belt of the corresponding box.

It may be observed that the filler means 40:

may be reinforced by a rib jumper arranged as a trailing edge fin, in particular inside the retention belt of the box in order to improve the retention effect; and/or may be reinforced by a filler casing having composite fibers and a resin of the epoxy or thermoplastic type, for example, the filler casing possibly being obtained by a method of winding, braiding, or draping fabric; and/or may be reinforced by impact absorber members such as foam, possibly reinforced by carbon fibers or the equivalent, and/or by damper members such as a member comprising an elastomer that damps energy by internal friction.

In the second embodiment of FIG. 3, at least one closed retention belt 23 comprises a tape 80 of unidirectional fibers spiral wound around the pin-receiving bushing 3 of the spar.

With reference to FIG. 1, the casing 30 then surrounds the centrifugal force take-up means 20. Consequently, the casing 30 is provided with inclined fibers at an angle relative to the unidirectional fibers of the centrifugal force take-up means 20, at an orientation lying in the range zero and plus or minus ninety degrees relative to the longitudinal axis.

In another aspect, the pin-receiving bushings of two distinct spars may be directed in directions that are distinct.

For example, the central spar 11 may have a retention belt with a top surface facing a suction-side face of the blade and a bottom surface facing a pressure-side face of the blade. Consequently, the pin-receiving bushing 3' is directed along the second direction Y.

Conversely, the leading edge extreme spar 12 and the trailing edge extreme spar 13 are provided with respective retention belts provided with first surfaces facing the leading edge of the blade and second surfaces facing the trailing edge of the blade. Consequently, the pin-receiving bushings 3" and 3'" of these spars are directed parallel to the third direction Z.

Figure 5:
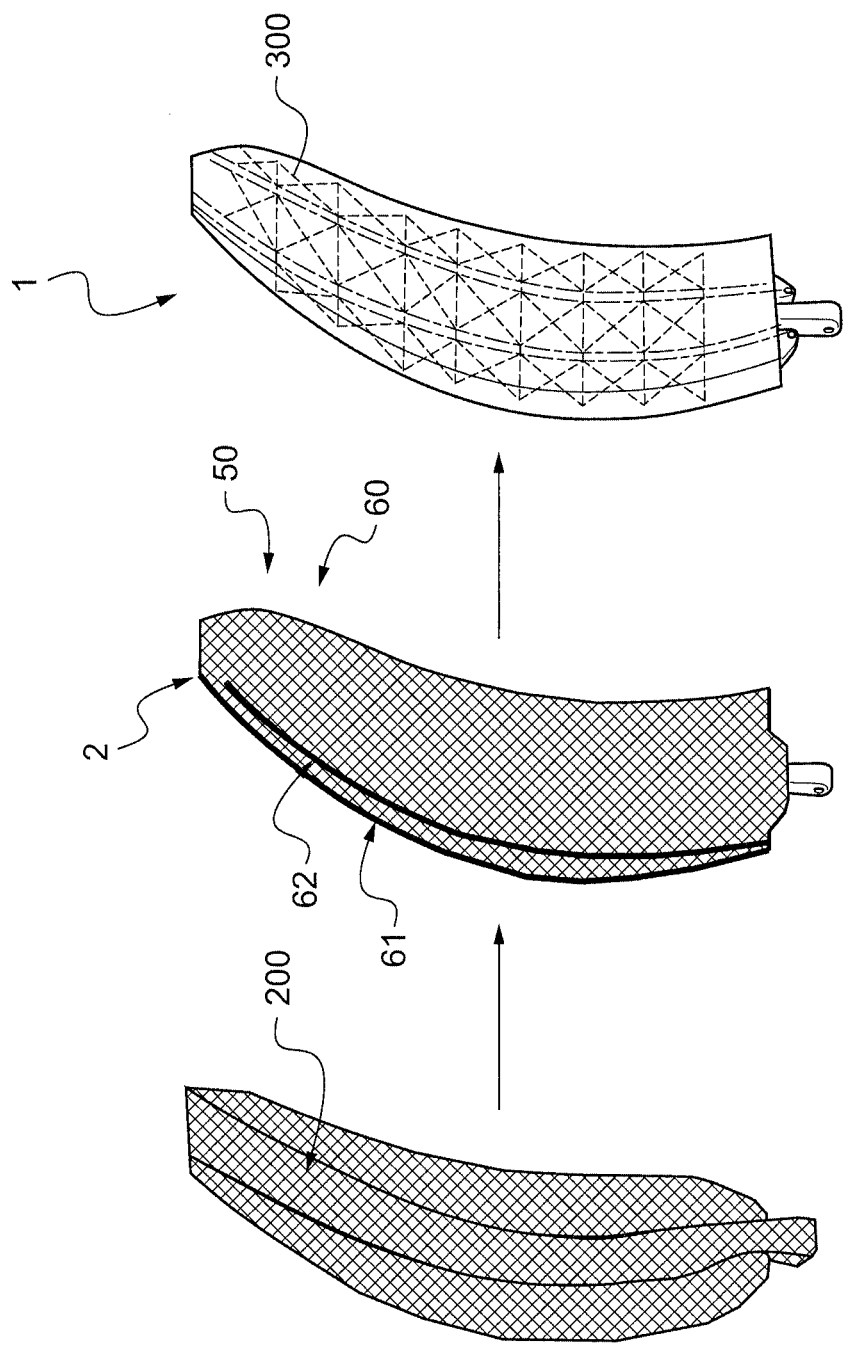

FIGS. 4 and 5 explain the steps of fabricating the blade 1.

With reference to FIG. 4, during a first design step, the fibers of the centrifugal force take-up means 20 of each spar 11, 12, and 13 are put into place, and then these centrifugal force take-up means 20 are polymerized.

Then, during a second design step, the casing 30 of each spar is fabricated

It is possible to braid the inclined fibers of a casing onto the centrifugal force take-up means 20, or to wind the inclined fibers of a casing onto the centrifugal force take-up means 20, or indeed to slide a "sock" provided with said inclined fibers onto the centrifugal force take-up means 20.

The central spar 11, the leading-edge extreme spar 12, and the trailing edge extreme spar 13 are then positioned beside one another to form an intermediate assembly 200.

The central spar 11, the leading edge extreme spar 12, and the trailing edge extreme spar 13 may be preassembled by using a set of retention tools, or else they may possibly be preassembled by using light preliminary winding for prefastening. Such preliminary winding may be made in the form of yarns of fibers wound around the spars in a helix such that its winding axis is the twisting axis of the blade.

Thereafter the outer covering 2 is made, as described with reference to FIG. 5.

This outer covering 2 may comprise outer fibers at an angle relative to the unidirectional fibers, such as an angle of plus or minus 45° for taking up twisting stresses.

These outer fibers may be applied by winding, by braiding, by means of fabric arranged on the assembly 200, or indeed by means of a "sock" slid onto the assembly 200.

It should be observed that the outer covering 2 may also include at least one piece of equipment 60, such as means 62 for combating the icing phenomenon and/or means 61 for providing shielding protection against impacts.

Furthermore, the blade 1 may include an additional covering 50 that is arranged either between the spars 10 and the outer covering 2, or else outside the outer covering 2, or indeed within the outer covering 2.

Finally, it is possible to arrange connecting reinforcement 300 between the spars and the outer covering 2. The connecting reinforcement 300 comprises connecting fibers passing through the outer covering and the spars, and through the additional covering, if any.

Figure 6:
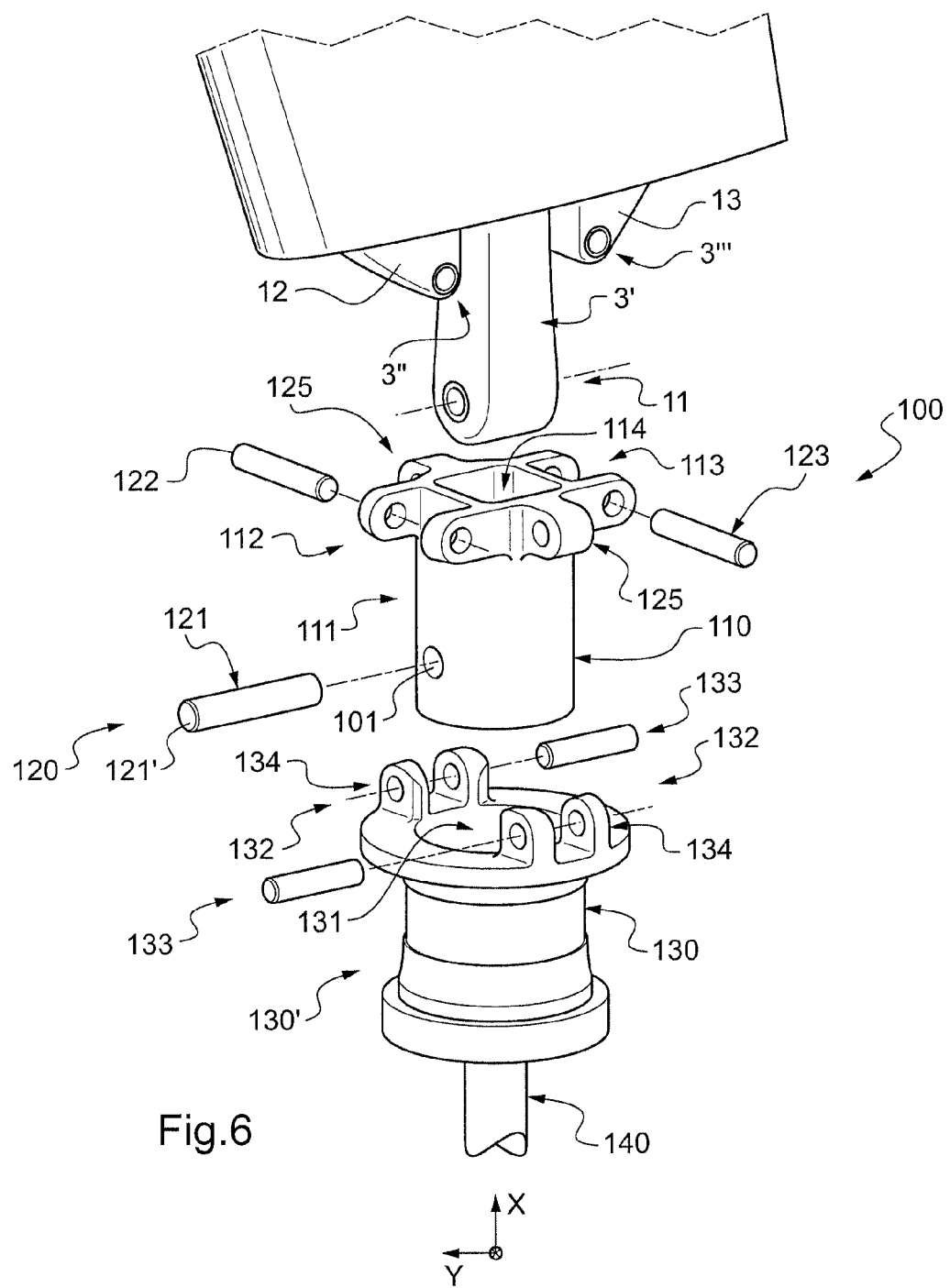
FIGS. 6 and 7 are diagrams showing attachment means.

Furthermore, FIG. 6 shows attachment means 100 in a preferred embodiment.

The attachment means 100 comprise a fitting 110, e.g. made of metal.

The fitting 110 has a body 111 fitted with fastener means 120 for fastening to the respective pin-receiving bushings of the spars 10 of the blade 1.

For example, the central spar 11 may have a first attachment zone 3' co-operating by shape interference with a docking orifice 114 formed in the body 111. The first attachment zone 3' that is shown has a section that is rectangular in shape, the body 111 defining a docking orifice 114 that forms a "tunnel" with a section that is complementary in shape to the shape of the first attachment zone 3'. Under such circumstances, the first attachment zone 3' is housed in the docking orifice 114.

Furthermore, first fastener means 121 include a bore 101 of the body 111 and a first pin 121'. The first pin 121' then passes through the bore 101 and the first attachment zone 3' of the pin-receiving bushing in the central spar 11. Advantageously, the first pin 121' does not project outside the body.

In addition, the fastener means 120 include respective forks 112 and 113 with associated pins 122 and 123 for fastening respective extreme spars. For example, each end may be a bolt with a straight body and a threaded endpiece, each pin co-operating with a nut and with a washer so that the threaded endpiece lies outside the corresponding pin-receiving bushing.

Thus, the second attachment zone 3" of the leading edge extreme spar 12 has a pin-receiving bushing connected in a second fork 112 by a second pin 122. Likewise, the third attachment zone 3'" of the trailing edge extreme spar 13 includes a pin-receiving bushing connected in a third fork 113 by a third pin 123.

The connection between the spars of the blade and the fitting 110 thus involves a plurality of paths, using one connection specific to each spar. Thus, if any one specific connection is accidentally destroyed, the other specific connections remain operational and serve to keep the lift-providing surface of the blade connected with the fitting.

In addition, this connection enables the lift-providing surface to be dismantled easily, e.g. for maintenance purposes.

It should be observed that the fitting 110 may be provided with a peripheral groove (not shown) so as to be guided by ball bearing or roller bearing means of the rotor. Such bearing means then serve to provide guidance and to transmit loads between the blade and the hub of the rotor.

In contrast, in the embodiment shown, the attachment means 100 include a sleeve 130 provided with such a peripheral groove 130'.

The body 111 of the fitting 110 is then partially inserted in a central bore 131 of the sleeve 130.

Furthermore, the sleeve 130 includes at least one attachment member 132 for attaching the fitting 110. Such an attachment member may comprise a fork 134 co-operating with a pin 133 and a projection 125 of the fitting 110.

It should be observed that the sleeve may include sealing means, such as gaskets arranged between the sleeve and the fitting in order to avoid any pollution or any stagnation of moisture.

It can be understood that such a sleeve may easily be separated from the fitting, in order to perform maintenance.

Figure 7:
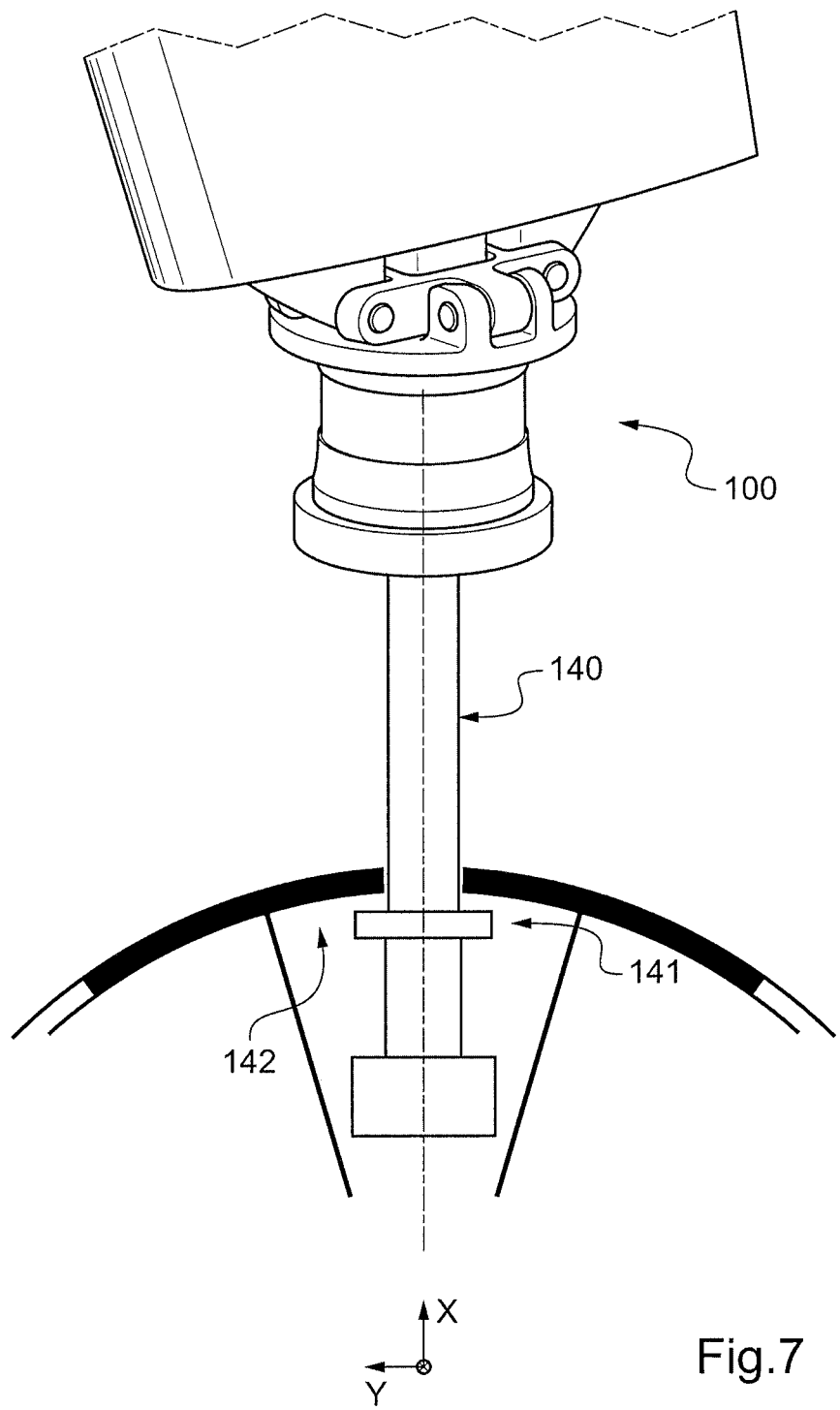

With reference to FIG. 7, the sleeve may include a pitch control shaft 140.

The pitch control shaft 140 may present a retention shoulder 141 outside the sleeve 130, suitable for co-operating with an abutment 142 of a hub.

It should be observed that when the attachment means 100 do not have a sleeve 130, the control shaft 140 is secured to the fitting 110.

Naturally, the present invention may be subjected to numerous variations as to its implementation. Although several embodiments are described, it should readily be understood that it is not possible to identify exhaustively all possible embodiments. It is naturally possible to envisage replacing any of the means described by equivalent means without going beyond the ambit of the present invention.

What is claimed is:

1. A rotor blade provided with an outer covering and with at least one load take-up spar associated with at least one pin-receiving bushing, the spar extending spanwise from an attachment zone towards a distal zone, the attachment zone of the spar having the at least one pin-receiving bushing of the spar passing therethrough, wherein the spar is a compartmentalized spar comprising centrifugal force take-up means incorporated within a twisting stress take-up casing, the centrifugal force take-up means comprising at least two boxes, each box having the pin-receiving bushing of the spar passing therethrough, each box forming a compartment of a spar, each box including a closed retention belt extending in the spanwise direction of the blade, the retention belt of one box of the spar surrounding the retention belt of another box of the spar, each retention belt being provided with unidirectional fibers wound around the pin-receiving bushing, the casing being provided with inclined fibers presenting an angle relative to the unidirectional fibers.

2. A blade according to claim 1, wherein the blade extends chordwise from a trailing edge zone towards a leading-edge zone by passing through a central zone, and the blade includes at least two spars that are held one against the other by the outer covering, these two spars being selected from a predetermined list including: a trailing edge extreme spar placed in the trailing edge zone; a leading edge extreme spar placed in the leading edge zone; and a central spar placed in the central zone; each spar having its own pin-receiving zone.

3. A blade according to claim 2, including an additional covering arranged either between the spars and the outer covering, or outside the outer covering, or else within the outer covering.

4. A blade according to claim 2, wherein the blade extends spanwise from a root to a free end, and the central spar extends spanwise from the root towards the free end.

5. A blade according to claim 2, wherein the central spar includes a retention belt provided with a top surface facing a suction-side surface of the blade and a bottom surface facing a pressure-side surface of the blade.

6. A blade according to claim 2, wherein at least one of the leading edge extreme spar and the trailing edge extreme spar includes a retention belt provided with a first surface facing the leading edge of the blade and a second surface facing the trailing edge of the blade.

7. A blade according to claim 1, wherein the blade includes at least a first spar co-operating with a first pin-receiving bushing and a second spar co-operating with a second pin-receiving bushing, the first pin-receiving bushing and the second pin-receiving bushing being offset in the chord direction and/or in the span direction.

8. A blade according to claim 1, wherein at least one box of the spar includes filler means incorporated in the retention belt defining the at least one box.

9. A blade according to claim 1, wherein the unidirectional fibers are directed along a longitudinal axis of the blade, and the casing of the spar is provided with inclined fibers presenting an angle lying in a range of zero to plus or minus ninety degrees relative to the longitudinal axis.

10. A blade according to claim 1, wherein the outer covering includes at least one piece of equipment selected from a group comprising means for combating icing phenomenon, and means for providing shielding protection against impacts.

11. A blade according to claim 1, wherein the at least one retention belt comprises a plurality of superposed and distinct layers of unidirectional fibers, each layer including at least one loop of unidirectional fibers wound around the pin-receiving bushing.

12. A blade according to claim 1, wherein the at least one closed retention belt comprises a tape of unidirectional fibers spiral wound around the pin-receiving bushing.

13. A blade according to claim 1, including connection reinforcement provided with connection fibers passing through the outer covering and through the spar.

14. A blade according to claim 1, including attachment means comprising a fitting provided with respective fastener means for each pin-receiving bushing.

15. A blade according to claim 14, wherein the blade is provided with a central spar arranged between a leading edge extreme spar and a trailing edge extreme spar, the attachment zone of the central spar co-operating via shape interference with a docking orifice formed in the fitting, and the attachment zone of each extreme spar being fastened in a respective fork of the fitting.

16. A blade according to claim 14, wherein the blade includes an attachment sleeve, the fitting being partially inserted in a bore of the sleeve, the fitting being reversibly fastened to the sleeve by at least one attachment member.

17. A blade according to claim 14, wherein the sleeve is secured to a pitch control shaft, the pitch control shaft presenting a retention shoulder outside the sleeve.

18. An aircraft provided with a rotor and wherein the rotor includes at least one blade according to claim 1.

19. A rotor blade provided with an outer covering and with a load take-up spar associated with a pin-receiving bushing, the spar extending spanwise from an attachment zone towards a distal zone, the attachment zone of the spar comprising the pin-receiving bushing of the spar passing therethrough, the spar being a compartmentalized spar comprising centrifugal force take-up boxes incorporated within a twisting stress take-up casing, each box having the pin-receiving bushing of the spar passing therethrough, each box forming a compartment of the spar, each box including a closed retention belt extending in the spanwise direction of the blade, the retention belt of one box of the spar surrounding the retention belt of another box of the spar, each retention belt being provided with unidirectional fibers wound around the pin-receiving bushing, and the casing being provided with fibers presenting an angle relative to the unidirectional fibers.

* * * * *